United States Patent
Tuerk

(10) Patent No.: US 6,419,301 B1
(45) Date of Patent: Jul. 16, 2002

(54) BULKHEAD ADAPTER FOR CARGO TRUCK

(75) Inventor: James Tuerk, Indianapolis, IN (US)

(73) Assignee: Aero Industries, Inc., Indianapolis, ID (US)

( * ) Notice: Subject to any disclaimer, the term of this patent is extended or adjusted under 35 U.S.C. 154(b) by 0 days.

(21) Appl. No.: 09/813,701

(22) Filed: Mar. 21, 2001

(51) Int. Cl.$^7$ .............................. B60J 7/22; B62D 35/00
(52) U.S. Cl. .................. 296/181; 296/180.1; 296/180.4
(58) Field of Search .............................. 296/181, 180.1, 296/180.4, 105, 100.12; 180/903

(56) References Cited

U.S. PATENT DOCUMENTS

| | | | | |
|---|---|---|---|---|
| 3,934,922 A | * | 1/1976 | MacCready, Jr. et al. ................................................... 296/180.4 |
| 4,342,480 A | * | 8/1982 | Ross, Jr. ..................... 296/105 |
| 4,902,064 A | | 2/1990 | Tuerk et al. |
| 5,536,062 A | * | 7/1996 | Spears ..................... 296/180.3 |
| 5,538,313 A | * | 7/1996 | Henning ..................... 296/105 |
| 6,010,176 A | * | 1/2000 | Jones ..................... 296/100.16 |
| 6,065,796 A | * | 5/2000 | Verduyn ................. 296/100.12 |
| 6,183,036 B1 | * | 2/2001 | Coulson ................. 296/100.13 |
| 6,224,141 B1 | * | 5/2001 | Brodlo ..................... 296/180.2 |
| 6,312,040 B1 | * | 11/2001 | Shinohara ............. 296/100.12 |

FOREIGN PATENT DOCUMENTS

GB  2186532  *  8/1987  .............. 296/180.4

OTHER PUBLICATIONS

U.S. Department of Transportation, "Federal Motor Carrier Safety Administration," Regulations, (Mar. 2, 2001).*
Aero Industries, Inc., "Conestoga 2000 Tarping System," (Jan. 20, 2000).*
Aero Industries, Inc., "Flatbed Accessories," (Jan. 20, 1999).*

* cited by examiner

Primary Examiner—Joseph D. Pape
Assistant Examiner—Greg Blankenship
(74) Attorney, Agent, or Firm—Maginot, Moore & Bowman, LLP

(57) ABSTRACT

A bulkhead adapter for a DOT rated bulkhead installed on a flatbed vehicle includes a pair of wings attached one to each side of the bulkhead. Each wing includes a vertical member attached to the side panel of the bulkhead and an upper member extending from the upper end of the vertical member. Each upper member is configured for attachment to the corner of the upper panel of the bulkhead, which may be curved or rounded. A compressible seal is disposed between each wing and the bulkhead. The wings are attached with suitable fasteners such as bolts or screws. The wings are preferably made of metal such as steel or aluminum. The adapter widens the bulkhead to allow for the installation of a flexible cover system such as the Conestoga® system to cover the bed of the vehicle to protect the cargo space from inclement weather and road debris.

17 Claims, 3 Drawing Sheets

US 6,419,301 B1

BULKHEAD ADAPTER FOR CARGO TRUCK

BACKGROUND OF THE INVENTION

This invention relates to an apparatus for increasing the width of a bulkhead of a flat bed vehicle, thereby adapting the bulkhead for use with a flexible tarp cover system for the vehicle bed.

Flat bed trailers are used to haul a variety of goods ranging from large heavy articles such as machinery to palletized goods. It is desirable, particularly with regard to weather sensitive goods, to provide a cover to protect a load during transit. Various types of cover systems have been used ranging from simple tarps held in place with cargo straps and tie downs to retractable tarp systems that cover and protect the entire trailer bed from weather and debris.

One such retractable tarp system is the Conestoga® tarp cover system manufactured and sold by Aero Industries of Indianapolis, Ind. Details of this type of cover system are disclosed in the U.S. Pat. No. 4,711,484, issued on Dec. 8, 1987, and U.S. Pat. No. 4,902,064, both of which are owned by the assignee of the present invention. The Conestoga® tarp system was developed to provide a tarp cover system that effectively protects not only the cargo area but also protects or seals the tarp cover deployment system. The Conestoga® system includes a wheel and track deployment system that rides along the outside edges of the trailer. In this manner, the entire trailer bed is under cover.

This type of tarping system typically requires that the trailer bulkheads be slightly wider than the trailer bed to provide an effective seal between the cover system and the bulkhead. This presents a problem with Department of Transportation rated bulkheads having a width restricted by Department of Transportation regulation 393.1066(c) which provides in part that "The front end structure must have a width which is at least equal to the width of the vehicle or which blocks forward movement of any cargo item being transported on the vehicle, whichever is narrower".

Accordingly, a need exists for an apparatus, which allows use of DOT-rated bulkheads with vehicle tarping systems, such as those described in the aforementioned patents.

SUMMARY OF THE INVENTION

The present invention provides a bulkhead adapter for a flatbed truck adapted for use with a DOT-rated bulkhead or more specifically, a bulkhead having a width no greater than the trailer width. The adapter is preferably used to widen the bulkhead for installation of a flexible cover system to cover the bed of the vehicle. In one aspect of the invention, the adapter includes a pair of wings attached one to each side of the bulkhead. A compressible seal is disposed between the wings and the sidewall of the bulkhead. A plurality of fasteners attaches the adapter to the bulkhead.

In one preferred embodiment, each wing includes a vertical member, which is attached to the side panel of the bulkhead, and an upper member which extends from the top of the vertical member. The upper member is attached to the corner of the top panel which may be curved or rounded. The upper member has a lower leg that telescopes into the vertical member to provide adjustment for varying bulkhead heights.

The present invention accomplishes one objective of providing an apparatus which when attached to a DOT-rated bulkhead provides for the installation of a flexible cover system thus allowing the truck be to be sealed from inclement weather and road debris This and other objects, advantages, and benefits are accomplished according to the devices of the following descriptions of the preferred embodiments of the present invention.

DESCRIPTION OF THE PREFERRED EMBODIMENTS

Figure 1:
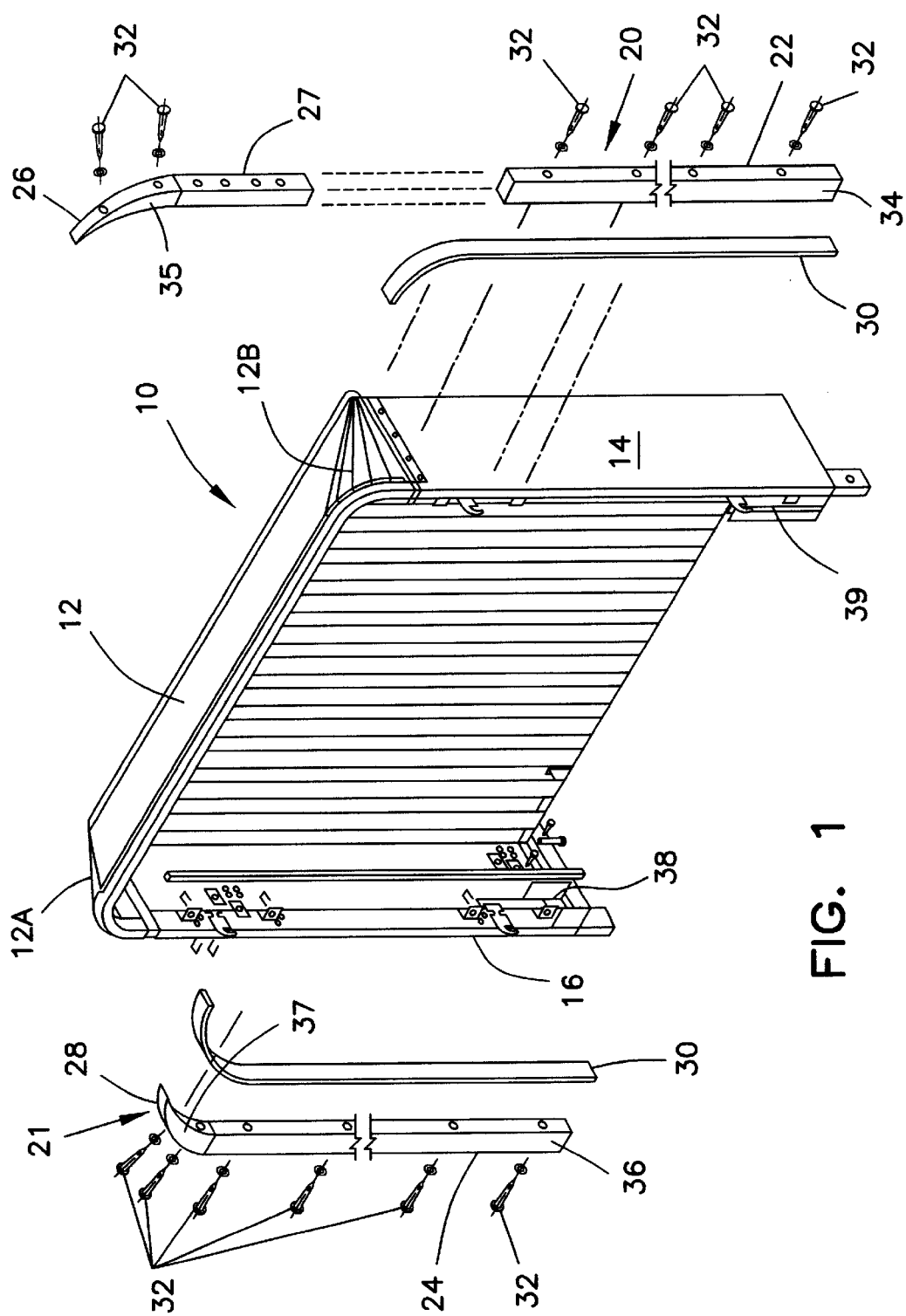
FIG. 1 is an exploded rear perspective view of a bulkhead and adapter apparatus according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions includes any alterations and further modifications in the illustrated devices and described methods and further applications of the principles of the invention which would normally occur to one skilled in the art to which the invention relates.

In FIG. 1, bulkhead 10 is shown which is suitable to be mounted on the a flat bed trailer, preferably of the forward end of the trailer. Bulkheads 10 include left and right side panels 16 and 14 respectively, and top panel 12. Top panel 12, which spans the width of bulkhead 10, preferably includes rounded ends 12A and 12B, which adjoin the upper ends of side panels 14 and 16. Bulkhead 10 also includes latch mechanisms 38 and 39, which are used to attach a tarp cover system to the bulkhead 10. Several bulkheads are available for use with the Conestoga® tarp system. These designs feature varying heights, side panel dimensions and front profiles.

The bulkhead 10 can be configured to protect the truck cab and its occupants from forward shifting of the cargo being hauled. The U.S. Department of Transportation has promulgated regulations that control the structure of bulkheads that are intended to withstand impacts from shifting loads. More specifically a Department of Transpiration-rated bulkhead is subject to certain dimensional restrictions. In one regulation, the width of the rated bulkhead is not allowed to exceed the width of the trailer. This regulated limitation presents a problem when it is desired to use bulkhead 10 with a tarp cover system, such as the Conestoga® system, which has a deployment mechanism that is mounted along the outer side rails of the trailer. This cover system is slightly wider than the trailer bed and therefore wider than a DOT-rated bulkhead.

To surmount this problem, the present invention contemplates a bulkhead adapter that marries this type of tarp cover system to a rated bulkhead. A bulkhead adapter assembly according to one embodiment of the present invention is shown in FIG. 1 in the form of right side and left side wing assemblies 20 and 21, respectively. Wing assemblies 20 and 21 attach to right and left side panels 14 and 16 respectively and also to round ends 12A and 12B of top panel 12. Wing 20 includes a vertically upstanding member 22 which attaches to side panel 14 and an upper member 26, which extends from vertical member 22. In FIG. 1, upper member 26 is curved to attach to rounded end 12B of top panel 12. The geometry of upper member can be tailored to match the contour of the corner of upper panel which may vary with different bulkheads. Similarly on the left hand side, vertical member 24 attaches to side panel 16 and upper member 28 attaches to rounded end 12A of top panel 12 on the left side of bulkhead 10. Wings 20 and 21 are preferably of metal construction. In a most preferred embodiment, the wings are made of steel or aluminum. The attachment of wings 20 and 21 to bulkhead 10 can be accomplished with suitable fasteners 32. Fasteners 32 include nuts and bolts, passing through predrilled holes in the side panels. Alternatively, screws can be used, such as sheet metal screws. In this instance, predrilled holes are not required. The fasteners are also suitable for installing non-Conestoga® type tarp covers.

Compressible seals 30 are applied between bulkhead 10 and adapter wings 20 and 21. Seals 30 may be of any suitable compressible material such as rubber or foam rubber. Seals 30 extend the full length of wings 20 and 21 so that the covered area of the truck bed is sealed from weather and road debris.

Figure 2:
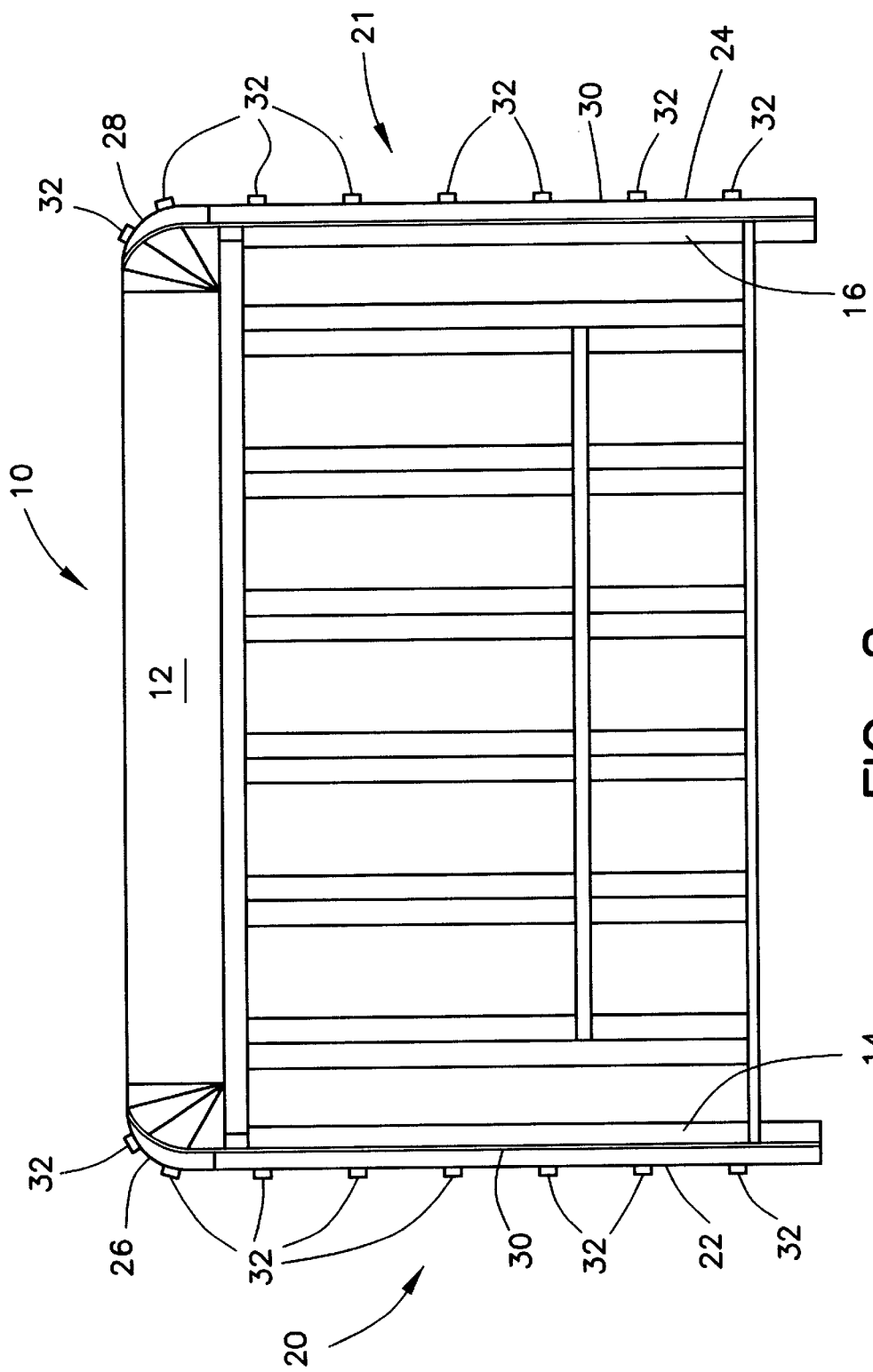
FIG. 2 is a front view of the bulkhead of FIG. 1 complete with adapter according to one embodiment of the present invention.

In FIG. 2, bulkhead 10 is depicted with adapter wings 21 and 22 installed. Wing portions 22, 24, 26, and 28 are shown slightly extending the width of bulkhead 10. Wings 20 and 21 are thus shown providing a mounting flange for the tarp cover system. Wings 20 and 21 provide sealing surfaces 34, 35, 36 and 37, respectively, against which the flexible tarp cover of the Conestoga® type tarp system abuts to seal the cargo area A seal, such as seals 30, can be mounted on the sealing surface 34-37. The attachment of the tarp cover system to bulkhead 10 is accomplished using latch mechanisms 38 and 39 which are specially provided for the Conestoga® tarp system. Attachment to other bulkheads not featuring this particular latch arrangement may be made through any suitable means, several of which are well-known in the art.

Figure 3:
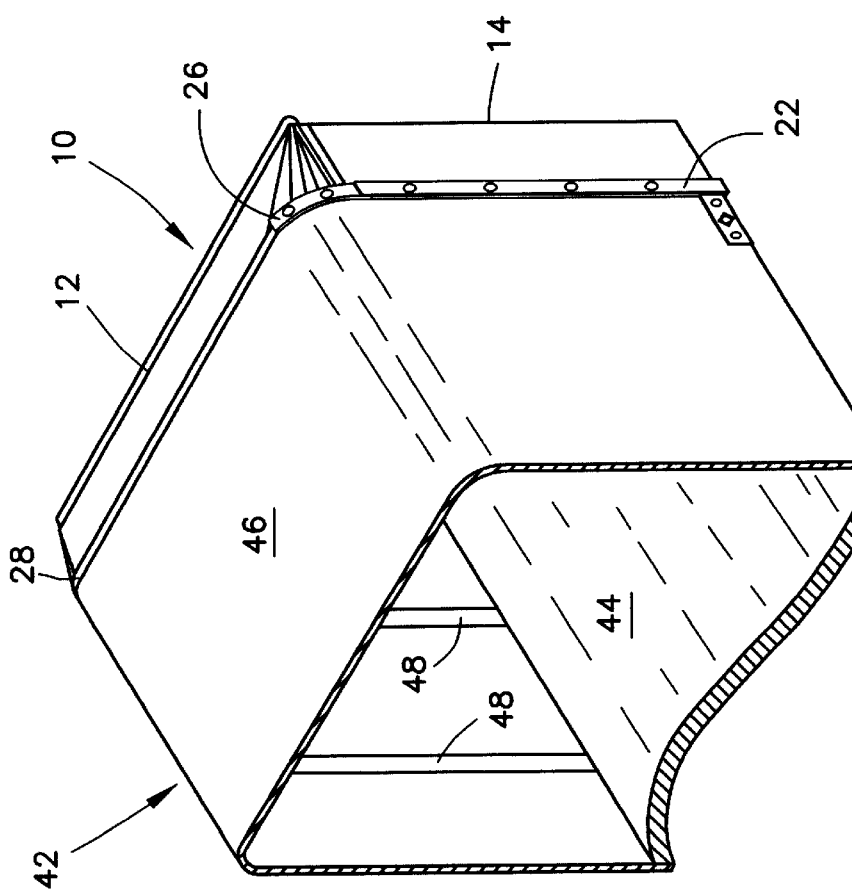
FIG. 3 is a rear perspective showing a partial flat truck bed with a Conestoga® tarp cover installed using one embodiment of an adapter according to the present invention.

FIG. 3 shows a partial view of a flat bed trailer with a DOT-rated bulkhead, a bulkhead adapter according to the present invention and a Conestoga® type flexible tarp cover installed. The front end of the trailer is shown with bulkhead 10 mounted at the forward end. Right side vertical member 22 and right side upper member 26, which make up the right hand wing, are visible along with a portion of the left side upper member 28. A Conestoga® tarp system 42 is shown sealed against right side wing 20. Left wing 21 is not visible in this view. A wheel and track system (see the aforementioned patents) mounts the Conestoga® tarp 42 to truck bed 44. The tarp system includes a number of U-shaped bow members 48 that span the truck bed and form the supporting structure for the flexible tarp cover 46. The bulkhead adapter and tarp system are removable should it be desired to return the truck to an open flatbed mode.

Though one particular style of bulkhead has been used for the purpose of demonstrating the invention, the bulkhead adapter of this invention may be retrofitted to practically any flatbed bulkhead currently in use. The upper wing member may be extended from the vertical wing member to adjust the adapter for the height of the bulkhead on which it is to be installed more specifically, the curved member 26 can include a linear section 27 that can be telescopically disposed within vertical member 22. The fasteners 32 can fix the curved member at a particular extension height relative to the vertical member. It is also contemplated that the curve member may be replaced with a component of a different contour to match the contour required for the particular bulkhead installation.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. For a flatbed vehicle having a DOT-rated bulkhead including a top panel and opposite side panels, an apparatus for extending the width of the bulkhead for installation of a flexible cover system to cover the bed of the vehicle when the flexible cover is deployed, said apparatus comprising:

a pair of wings attachable one to each of the opposite side panels of the bulkhead to widen the bulkhead; and means for attachment of each of said pair of wings to the side panels.

2. The apparatus of claim 1 wherein each said wing includes a vertically upstanding member and an upper member extending from an upper end of said vertical member configured to match a corner of the bulkhead between the top panel and the corresponding side panel.

3. The apparatus of claim 2 wherein said upper end of said vertical member defines a channel and said upper member includes a lower end slidably receivable in said channel.

4. The apparatus of claim 2 wherein said upper member is integral with said vertical member.

5. The apparatus of claim 1 wherein each of said pair of wings defines a rearward facing sealing surface for engagement with the flexible cover system.

6. The apparatus of claim 1 wherein said attachment means includes a plurality of fasteners.

7. The apparatus of claim 1 further including a first seal disposed between each said wing and the bulkhead.

8. The apparatus of claim 7 wherein said first seal is a compressible seal.

9. The apparatus of claim 7 wherein said first seal includes a caulking material.

10. The apparatus of claim 5 further including a second seal attachable to said sealing surface to seal the flexible cover system to said bulkhead.

11. The apparatus of claim 10 wherein said second seal includes a gasket.

12. A bulkhead kit for a flatbed vehicle having a flexible cover system to cover the bed of the vehicle when the flexible cover is deployed, said bulkhead kit comprising:

a DOT-rated bulkhead, including a top panel and opposite side panels;

a pair of wings attachable one to each of said opposite side panels of said bulkhead to widen said bulkhead; and means for attachment of each of said pair of wings to said side panels.

13. The bulkhead kit of claim 12 wherein each said wing includes a vertically upstanding member and an upper, member extending from an upper end of said vertical member configured to match a corner of said bulkhead between said top panel and said corresponding side panel.

14. The bulkhead kit of claim 12 wherein said upper end of said vertical member defines a channel and said upper member includes a lower end slidably receivable in said channel.

15. The bulkhead kit of claim 12 further including a fist seal disposed between each said wing and said bulkhead.

16. The bulkhead kit of claim 12 wherein each of said pair of wings defines a rearward facing sealing surface for engagement with the flexible cover system.

17. The bulkhead kit of claim 16 further including a second seal attachable to said sealing surface to seal the flexible cover to said bulkhead.

* * * * *